(12) United States Patent
Pina Lopez et al.

(10) Patent No.: US 11,167,835 B2
(45) Date of Patent: Nov. 9, 2021

(54) AIRCRAFT REAR FUSELAGE SECTION AND MANUFACTURING METHOD THEREOF

(71) Applicant: Airbus Operations, S.L.U., Getafe (ES)

(72) Inventors: José María Pina Lopez, Getafe (ES); Enrique Vera Villares, Getafe (ES)

(73) Assignee: AIRBUS OPERATIONS S.L.U., Getafe (ES)

( * ) Notice: Subject to any disclaimer, the term of this patent is extended or adjusted under 35 U.S.C. 154(b) by 335 days.

(21) Appl. No.: 16/225,966

(22) Filed: Dec. 19, 2018

(65) Prior Publication Data
US 2019/0185131 A1  Jun. 20, 2019

(30) Foreign Application Priority Data

Dec. 19, 2017 (EP) .................................. 17382865

(51) Int. Cl.
| | | |
|---|---|---|
| *B64C 1/06* | (2006.01) | |
| *B64C 1/12* | (2006.01) | |
| *B64F 5/10* | (2017.01) | |
| *B64C 1/00* | (2006.01) | |

(52) U.S. Cl.
CPC ................ *B64C 1/12* (2013.01); *B64C 1/061* (2013.01); *B64C 1/064* (2013.01); *B64F 5/10* (2017.01); *B64C 2001/0072* (2013.01)

(58) Field of Classification Search
CPC ........... B64C 1/12; B64C 1/061; B64C 1/064; B64C 2001/0072
See application file for complete search history.

(56) References Cited

U.S. PATENT DOCUMENTS

| | | | | |
|---|---|---|---|---|
| 3,976,269 | A | * | 8/1976 | Gupta ...................... B64C 1/12 244/119 |
| 7,810,758 | B2 | | 10/2010 | Garcia Laja et al. |
| 7,967,250 | B2 | | 6/2011 | Lobato et al. |
| 2008/0164375 | A1 | * | 7/2008 | Garcia Laja .............. B64C 1/26 244/131 |

(Continued)

FOREIGN PATENT DOCUMENTS

EP     2889211 A1    7/2015

OTHER PUBLICATIONS

European Search Report; priority document.

*Primary Examiner* — Philip J Bonzell
*Assistant Examiner* — Tye William Abell
(74) *Attorney, Agent, or Firm* — Greer, Burns & Crain, Ltd.

(57) ABSTRACT

A lower fuselage shell for an aircraft rear fuselage section, wherein the lower fuselage shell is made of a composite material and comprises at least one lower skin and stringers integrally formed with the lower skin, and frame segments extending crosswise relative to the stringers. Shear-ties are co-cured or co-bonded with the lower skin and extend crosswise relative to the stringers. Frame segments are fastened to the shear-ties, such that the frame segments are distanced from the lower skin. An aircraft rear fuselage section comprises an upper fuselage shell and the described lower fuselage shell. The upper fuselage shell has an upper skin reinforced with omega-shaped stringers, and the lower shell has a lower skin reinforced with T-shaped stringers.

6 Claims, 1 Drawing Sheet

(56) References Cited

U.S. PATENT DOCUMENTS

| | | | |
|---|---|---|---|
| 2009/0277994 A1* | 11/2009 | Lobato | B64C 1/12 |
| | | | 244/119 |
| 2010/0308172 A1* | 12/2010 | Depeige | B64C 1/1461 |
| | | | 244/132 |
| 2015/0183504 A1* | 7/2015 | Arevalo Rodriguez | |
| | | | B32B 37/16 |
| | | | 244/119 |

* cited by examiner

AIRCRAFT REAR FUSELAGE SECTION AND MANUFACTURING METHOD THEREOF

CROSS-REFERENCES TO RELATED APPLICATIONS

This application claims the benefit of the European patent application No. 17382865.8 filed on Dec. 19, 2017, the entire disclosures of which are incorporated herein by way of reference.

FIELD OF THE INVENTION

The present invention refers in general to aircraft fuselages. More specifically, the invention refers to the design and manufacturing of a fuselage rear section obtained from composite materials.

An object of the invention is to increase production and assembly rates in the manufacture of a fuselage rear section, thereby also reducing manufacturing costs.

Another object of the invention is to improve accuracy in the production of the components of the rear section, to satisfy final assembly tolerances.

BACKGROUND OF THE INVENTION

Aircraft fuselages are generally made of composite materials and are composed of a skin internally reinforced by structural components like: stringers joined to the skin and arranged in the longitudinal direction of the aircraft, and frames transversally arranged to the stringers. Typically, the stringers are co-cured or co-bonded with the skin in one-shot (one curing cycle), so that it is commonly said that the stringers are integrally formed with the skin.

It is known that aircraft fuselages are produced in several sections, namely: nose, aft, mid and rear sections, that are assembled together at a final assembly line. In particular, as shown in FIG. 1, a fuselage rear section (1) is the section of the fuselage to which the vertical (2) and horizontal (3) stabilizers are mounted.

Depending of the size of the aircraft, skins of a rear section are formed either by a single panel extending all around the fuselage and obtained in one-shot, or by several panels or shells produced individually and assembled together at a subsequent stage. In both cases, only one type of stringer is traditionally used for the entire fuselage rear section to reinforce the skin, normally omega stringers in the case of only one panel skins, or T-stringers in the case of skins formed by several panels.

As per the frames, these are manufactured separately in segments. In some cases, the frames are directly fastened to the skin. In other cases, the frames are attached to the skin using an additional component known as shear-ties or shear-cleats. Shear-ties are fastened to the skin and the frames are fastened to the shear-ties, so that these frames can be regarded as floating frames considering that they are separated from the skin. The process of fastening the shear-tiers to the skin, and fastening the frames to the shear-ties is time-consuming.

The US patent publication US 2010/0308172 A1 is an example of the above-described fuselage structure.

Other fuselage structural components are beams, which act as frames to reinforce open areas of the skins, like access panels or skin cut-outs.

A known type of fuselage rear sections are those having lateral cut-outs for receiving and allowing trimming of the horizontal stabilizer. The U.S. Pat. No. 7,810,758 B2 shows an example of a rear section of this type.

Aircraft fuselages are nowadays produced from composite materials like Carbon Fiber Reinforced Plastic (CFRP) or other composite materials.

In the aeronautical industry it is always desirable to increase production rates and to reduce manufacturing costs.

SUMMARY OF THE INVENTION

The present invention is based on the realization that different parts of a rear fuselage section have different geometries and have to comply with different load requirements. More specifically, whereas an upper fuselage shell is highly loaded because it is attached to the vertical and horizontal stabilizers, the loads that a lower fuselage shell has to withstand are usually lower than the upper shell.

According to the invention, the design and manufacturing process of a rear fuselage section is disaggregated between an upper shell and a lower shell, such that the manufacturing process of each of these shells is optimized considering their particular geometry and load requirements.

Therefore, an aspect of the invention involves a composite lower fuselage shell for an aircraft rear section, wherein the shell comprises at least one lower skin panel and stringers integrally formed with the lower skin and extending longitudinally in an aircraft lengthwise direction (when the rear section is assembled with the complete fuselage).

The lower fuselage shell further comprises frame segments extending crosswise relative to the stringers, and shear-ties integrally formed with the lower skin panel or panels and also extending crosswise relative to the stringers. The frames segments are mechanically fastened to the shear-ties, such that the frame segments are distanced from the lower skin panel or panels, so that the time-consuming tasks of riveting the frames to the skin, is eliminated.

With respect to the term "integrally formed," this means that the stringers and shear-ties are co-cured or co-bonded with the skin panel or panels.

The invention also refers to a rear fuselage section comprising a composite upper fuselage shell and the lower fuselage shell previously defined, wherein upper and lower shells are attached to each other to configure together the rear fuselage section for an aircraft. The skin of upper fuselage shell is internally reinforced by omega-shaped stringers integrally formed therein, while the skin of the lower fuselage shell is internally reinforced by T-shaped stringers integrally formed therein.

The omega-shaped stringers are suitable for a highly loaded upper shell. However, the less stressed lower shell can be reinforced with T-shaped stringers which are easier to manufacture and are generally lighter than the omega-stringers.

Preferably, the skins of the upper shell and the lower shell, are produced as a single panel.

The invention also refers to a method for manufacturing a rear fuselage section for an aircraft, wherein the method comprises the steps of manufacturing a lower fuselage shell including a lower skin having an internally reinforcing structure, and an upper fuselage shell including an upper skin having an internally reinforcing structure, and wherein the lower skin is produced by means of a first technique of layering composite materials, and wherein the upper skin is produced by means of a second technique of layering composite materials which is different from the first technique, the method further comprising the steps of assembling the lower and upper shells to form together the rear fuselage section.

Preferably and according to the invention, the first technique of layering composite materials is Fiber Placement which is suitable for the manufacture of geometrically complex composite panels, and the second technique comprises a modular technology, that is carried out, for example, in an ATL (Automatic Tape Layering) machine.

The steps of manufacturing the lower and upper shells, comprises co-curing or co-bonding T-shaped stringers to the lower skin, and co-curing or co-bonding omega-shaped stringers to the upper skin. Furthermore, the step of manufacturing the lower shell comprises co-curing or co-bonding shear-ties to the lower skin, such that the shear-ties are arranged crosswise to the stringers, and riveting or bolting frames segments to the shear-ties, such that the frame segments are distanced from the skin.

Some advantages of the invention are listed below:
production of two different fuselage shells in different manufacturing processes, tooling etc.; allows optimization of each process;
reduced riveting operation of lower frames segments to lower skin panels;
ease sub-assembly operations, for example preassembly of lower frames segments to lower skin panels;
improved accuracy in final assembly tolerances;
disaggregating the production and pre-assembly of upper and lower shells, would ease the whole process and future individual modifications if needed.

BRIEF DESCRIPTION OF THE DRAWINGS

Preferred embodiments of the invention, are henceforth described with reference to the accompanying drawings, wherein.

DETAILED DESCRIPTION OF THE PREFERRED EMBODIMENTS

Figure 2:
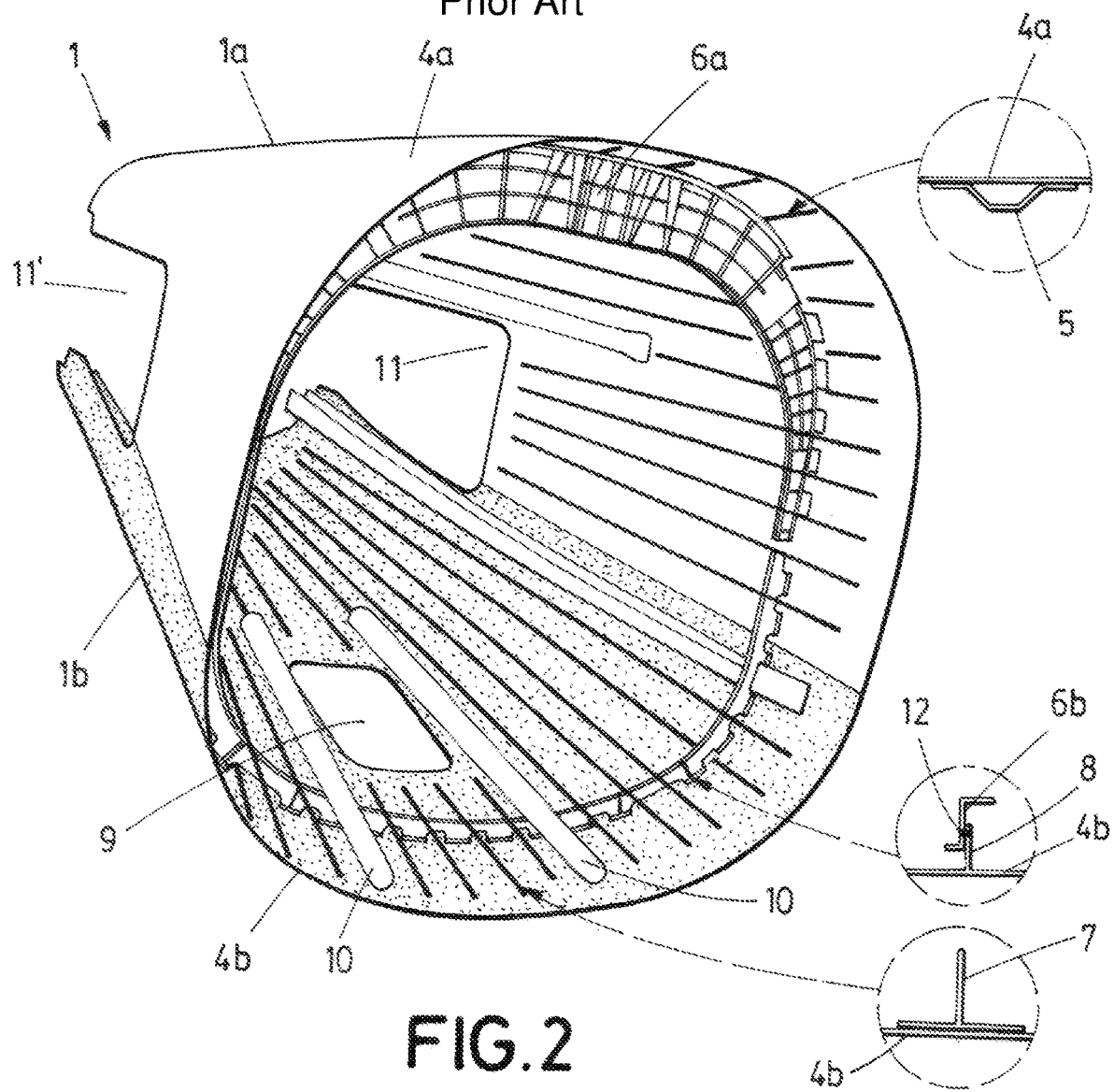
FIG. 2 shows a perspective view of a rear fuselage section according to the invention. Upper and lower shells are identified in the figure. The stringers, frame segments and shear ties are shown as enlarged details at the right hand side of the figure. The extended view of the frame segments and shear ties, is a cross-sectional view according to a longitudinal plane.

FIG. 2 shows a preferred embodiment of a rear fuselage section (1) formed by an upper fuselage shell (1a) and a lower fuselage shell (1b) assembled to each other to configure together the rear fuselage section. The upper fuselage shell (1a) has an upper skin (4a) and omega-shaped stringers (5) integrally formed with the upper skin (4a) and extending longitudinally. Frame segments (6a) extend crosswise relative to the stringers (5) and are fastened directly to the skin.

The lower fuselage shell (1b) comprises a lower skin (4b) and T-shaped stringers (7) integrally formed with the lower skin (4b) and extending longitudinally. Frame segments (6b) extend crosswise relative to the T-shaped stringers (7). The lower fuselage shell (1b) further comprises composite shear-ties (8) integrally formed with the lower skin (4b) and extending crosswise relative to the T-shaped stringers (7). The frame segments (6b) are mechanically fastened (riveted or bolted (12)) to the shear-ties (8), such that the frame segments (6b) are distanced from the lower skin (4b).

Preferably, the frame segments (6b) are Z-shaped.

The stringers (5,7) of the upper and lowers shells (1a,1b) are co-cured or co-bonded with the upper and lower skins (4a,4b). Similarly, the shear-ties (8) are co-cured or co-bonded with the lower skin (4b).

Figure 1:
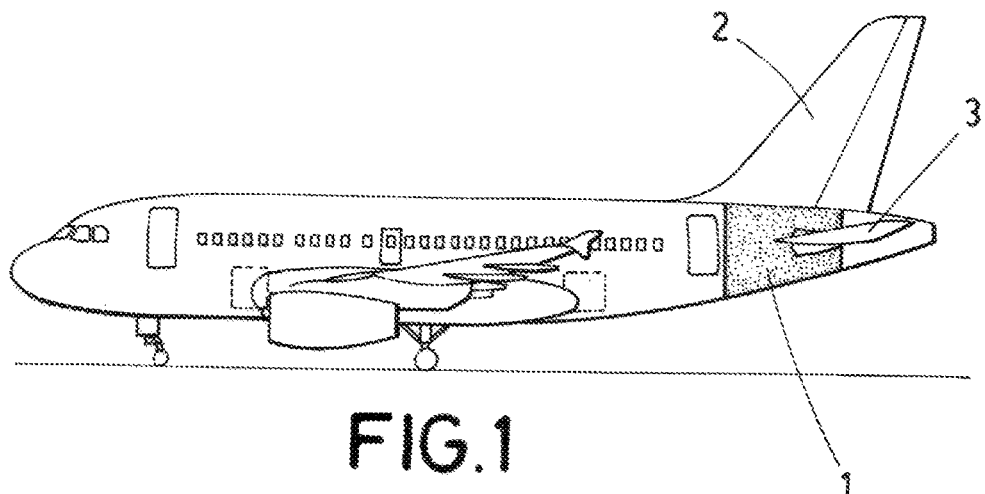
FIG. 1 shows a side elevational view of an aircraft according to the prior-art, wherein the rear fuselage section is marked as a darkened area.

The upper shell (1a) has two lateral cut-outs (11,11') for receiving and allowing trimming of a horizontal tail plane (3) (as shown in FIG. 1). Each one of these cut-outs (11,11') define a U-shaped edge having upper and lower edges and a vertical edge. As shown in FIG. 2, the lower shell (1b) generally extends from the lower edge of one lateral cut-out to the lower edge of the other cut-out.

The lower skin (4b) has an access opening (9), and two longitudinally extending beams (10) joined to the skin, to reinforce an area around the access opening (9).

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft rear fuselage section comprising an upper fuselage shell and the lower fuselage shell,
wherein the lower fuselage shell is made of a composite material and comprises:
at least one lower skin,
stringers integrally formed with the lower skin and extending longitudinally with respect to a longitudinal direction of the rear fuselage section,
frame segments extending crosswise relative to the stringers, and
composite shear-ties integrally formed with the lower skin and extending crosswise relative to the stringers,
the frame segments being fastened to the shear-ties, such that the frame segments are distanced from the lower skin,
wherein the upper and lower fuselage shells are attached to each other to configure together the rear fuselage section, and
wherein the upper fuselage shell has an upper skin and omega-shaped stringers integrally formed with the upper skin and extending longitudinally, and frame segments extending crosswise relative to the omega-shaped stringers, the omega-shaped stringers having two portions of the stringer on opposite sides of a connecting portion of the stringer, the two portions being parallel to one another and extending in a same direction from the connecting portion, and
wherein the upper shell has two lateral cut-outs for receiving and allowing trimming of a horizontal tail plane, each one of these cut-outs define a U-shaped edge having upper and lower edges parallel to one another and a vertical edge connecting the upper and lower edges, and the lower shell extends substantially from the lower edge of one lateral cut-out, to the lower edge of the other cut-out.

2. The lower fuselage shell according to claim 1, wherein at least one of the stringers or the shear-ties are co-cured or co-bonded with the lower skin.

3. The lower fuselage shell according to claim 1, wherein the frame segments are riveted or bolted to the shear-ties.

4. The lower fuselage shell according to claim 1, wherein the frame segments are Z-shaped, having two portions of the frame segment on two opposing sides of a connecting frame segment portion, the two portions being parallel to one another and extending in opposite directions from the connecting frame segment portion.

5. The lower fuselage shell according to claim 1, wherein the stringers are T-shaped, having a first portion of the frame segment arranged perpendicular to a second portion of the frame segment.

6. The lower fuselage shell according to claim 1, wherein the lower skin has an access opening and two beams to reinforce an area around the access opening, wherein the beams are joined to the skin and extend longitudinally.

* * * * *